United States Patent
Linares Villegas et al.

(10) Patent No.: US 12,006,022 B2
(45) Date of Patent: Jun. 11, 2024

(54) AIRCRAFT EMPENNAGE

(71) Applicant: Airbus Operations S.L.U., Getafe (ES)

(72) Inventors: Mario Linares Villegas, Getafe (ES); Silvia Garcia Toran, Getafe (ES)

(73) Assignee: Airbus Operations S.L.U., Getafe (ES)

( * ) Notice: Subject to any disclaimer, the term of this patent is extended or adjusted under 35 U.S.C. 154(b) by 0 days.

(21) Appl. No.: 17/526,386

(22) Filed: Nov. 15, 2021

(65) Prior Publication Data

US 2022/0306271 A1 Sep. 29, 2022

(30) Foreign Application Priority Data

Mar. 26, 2021 (EP) .................................. 21382253

(51) Int. Cl.
*B64C 1/26* (2006.01)
*B64C 1/06* (2006.01)
*B64C 9/02* (2006.01)

(52) U.S. Cl.
CPC .............. *B64C 1/26* (2013.01); *B64C 1/0685* (2020.01); *B64C 9/02* (2013.01)

(58) Field of Classification Search
CPC .................................... B64C 5/10; B64C 5/16
See application file for complete search history.

(56) References Cited

U.S. PATENT DOCUMENTS

| | | | |
|---|---|---|---|
| 3,949,958 A * | 4/1976 | Richter | .............. B64C 13/12 |
| | | | 244/227 |
| 6,273,363 B1 | 8/2001 | Sprenger | |
| 8,033,500 B1 * | 10/2011 | Charafeddine | ........... B64C 9/02 |
| | | | 244/99.2 |
| 2010/0148000 A1 | 6/2010 | Llamas Sandin et al. | |
| 2022/0306271 A1 * | 9/2022 | Linares Villegas | ....... B64C 5/02 |

FOREIGN PATENT DOCUMENTS

| | | |
|---|---|---|
| ES | 2781400 A1 | 9/2020 |
| JP | H02262497 A | 10/1990 |

OTHER PUBLICATIONS

European Search Report; priority document.
N. Wachendorf, et al., "Multivariable Controller Design for a Trimmable Horizontal Stabilizer Actuator with Two Primary Load Paths" Hamburg University of Technology, Institute of Aircraft Systems Engineering, 26th International Congress of the Aeronautical Sciences, Sep. 19, 2008; pp. 1-12.

* cited by examiner

*Primary Examiner* — Richard Green
*Assistant Examiner* — Nevena Aleksic
(74) *Attorney, Agent, or Firm* — Greer, Burns & Crain, Ltd.

(57) ABSTRACT

An aircraft empennage, comprising a rear fuselage section, a trimmable horizontal tail plane comprising a first and a second lateral torsion box), each comprising a front spar and a rear spar, a front fitting and a rear fitting, an actuator acting on the front fitting for a rotation of the trimmable horizontal tail plane around a hinge axis passing through the rear fitting, the front fitting comprising a first and a second front fitting units being joined to the front spars of the lateral torsion boxes, and the actuator comprising first and a second actuator units, each acting on the first front fitting unit and the second front fitting unit respectively.

7 Claims, 5 Drawing Sheets

AIRCRAFT EMPENNAGE

CROSS-REFERENCES TO RELATED APPLICATIONS

This application claims the benefit of the European patent application No. 21382253.9 filed on Mar. 26, 2021, the entire disclosures of which are incorporated herein by way of reference.

FIELD OF THE INVENTION

The present invention relates to an aircraft empennage comprising a configuration of a Trimmable Horizontal Stabilizer Actuator (THSA) that allow more space in the pressurized section of the fuselage to accommodate passengers and/or cargo and furthermore to have access to the actuators from the outside of the aircraft.

BACKGROUND OF THE INVENTION

Commercial passenger aircraft have a Horizontal Tail Plane (HTP) that rotates around a hinge line to modify the angle of attack depending on the flight conditions.

It is known that the horizontal tail plane (HTP) may comprise two lateral torsion boxes, each lateral torsion box, in turn, comprising a front spar and a rear spar.

The horizontal tail plane (HTP) is often connected to the fuselage by three fittings:

Two fittings, called rear fittings, located at the rear spars of the lateral torsion boxes. The two fittings are symmetrically located with respect to a vertical longitudinal plane of symmetry of the aircraft. The hinge axis for horizontal tail plane (HTP) rotation is orthogonal to this vertical longitudinal plane of symmetry.

One fitting, called front fitting, located at the front spar of the lateral torsion boxes in the vertical longitudinal plane of symmetry of the aircraft.

It is also known to locate a Trimmable Horizontal Stabilizer Actuator (THSA) which is located between the horizontal tail plane (HTP) front fitting and the fuselage. This actuator actuates the horizontal tail plane (HTP) in rotation around its hinge axis.

It is also known that a Rear Pressure Bulkhead separates the pressurized section of the fuselage for hosting passengers and/or cargo from the fuselage tail cone section which is not pressurized.

The position of the Rear Pressure Bulkhead is limited by the trimmable horizontal stabilizer actuator (THSA), thus, the above-described configuration of the empennage determines the position of the Rear Pressure Bulkhead. It is needless to say how important it is to provide more pressurized space in order to optimize the "operational" costs of a commercial aircraft.

Substantially below the actuator there is an access or maintenance door with two main functions:

Provide access to the trimmable horizontal stabilizer actuator (THSA) for maintenance.

Provide passage to the trimmable horizontal stabilizer actuator (THSA) for replacement The position of the Rear Pressure Bulkhead is also limited by the location of the maintenance door under the actuator.

In addition, known empennages comprise several maintenance platforms or scaffolds located between the maintenance door and the actuator to facilitate access from the door to the actuator, as well as to provide a working station at a reasonable distance and height from the THSA for a human operator. These maintenance platforms have to be built and maintained and add useless additional weight in flight.

SUMMARY OF THE INVENTION

The aircraft empennage of the invention comprises:

A rear fuselage section comprising a skin and a frame.

A trimmable horizontal tail plane comprising two lateral torsion boxes, specifically a first lateral torsion box and a second lateral torsion box. Each lateral torsion box in turn comprises a front spar and a rear spar.

A front fitting and a rear fitting connected to the trimmable horizontal tail plane and to the fuselage section. In an embodiment, the front fitting and the rear fitting are attached at one end to the front spar and the rear spar of the torsion boxes, respectively. The other end of the fittings is joined to intermediate elements connecting the fitting to the fuselage section.

An actuator configured to act on the front fitting for the rotation of the trimmable horizontal tail plane. The rotation of the trimmable horizontal tail plane is made around a hinge axis passing through the rear fitting which is orthogonal to a vertical longitudinal plane of symmetry of the fuselage section. More specifically, an end of the front fitting is joined to the actuator and the actuator is joined to a fitting which is turn joined to the fuselage section.

The horizontal tail plane is movable with respect to the rear fuselage section in which it is at least partly housed. In particular, the central attachment between a port lateral torsion box and a starboard lateral torsion box is housed in the rear fuselage section and is movable with respect to the rear fuselage section, due to the actuator.

The front fitting object of the invention comprises two fitting units and the actuator comprises two actuator units. Each fitting unit is joined to the front spar of a lateral box and each actuator unit is configured to act on a fitting unit.

The front fitting comprises a first and a second front fitting units. The first front fitting unit is joined to the front spar of the first lateral box. The second front fitting unit is joined to the front spar of the second lateral box. Likewise, the actuator comprises a first and a second actuator units. The first actuator unit is configured to act on the first front fitting unit and the second actuator unit is configured to act on the second front fitting unit.

These two actuators may be smaller than a single actuator, so that the space required for the trimmable horizontal tail plane actuation is optimized by using two smaller actuators instead of one.

In addition, in an embodiment, the horizontal tail plane comprises a swept-back angle. A swept horizontal tail plane is a tail plane that angles backward from its vertical longitudinal plane of symmetry rather than in a straight sideways direction. In this embodiment, the swept angle of the trimmable horizontal tail plane allows the placement of the actuators in a more backward position with respect to a longitudinal axis of the rear fuselage section. A longitudinal axis is an axis along the lengthwise direction of the aircraft, i.e., the roll axis.

In another embodiment, the first and the second actuator units may be located rearward of a most forward point of the trimmable horizontal tail plane along a longitudinal axis of the rear fuselage section. Thus, the actuator units are located in the area between the most forward point of the horizontal tail plane and the horizontal tail plane itself.

Therefore, due to the horizontal tail plane sweep, i.e., as the trimmable horizontal tail plane angles backwards from its root, the actuators can be positioned further back with respect to the longitudinal direction of the aircraft. The space left free at the sides of the front of the horizontal tail plane due to the horizontal tail plane sweep is used.

With these different configurations, the Rear Pressure Bulkhead can be placed more at the rear direction of the aircraft, and this provides more space in passenger and cargo cabins. In an embodiment, the position is limited by the most forward point of the trimmable horizontal tail plane and not by the location of the actuators.

In an embodiment, the fuselage section comprises a first and a second access door to the first and the second front fitting units which are located on opposite lateral sides of the rear fuselage section.

More specifically, the actuator units can be located adjacent, not distant, to the skin of the fuselage, one in each lateral side of the fuselage section, so that maintenance and replacement tasks can be performed from outside of the aircraft in a fast way. Indeed, the distance between the lateral skin of the fuselage and the actuator units of the invention may be close at hand, for instance, of about or less than an average human arm length. There is thus no need for an operator to enter the fuselage section to carry out maintenance or replacement of the actuator units. Thus, the access doors allow maintenance and replacement tasks to be carried from outside of the aircraft.

The above embodiment provides a faster maintenance access because no entry into the aircraft is required for actuator maintenance tasks. Moreover, maintenance platforms can be removed because they are not necessary for trimmable horizontal tail plane actuator maintenance.

Additionally, as previously stated in the state of the art, the lower door also limits to shift the Rear Pressure Bulkhead and, in this embodiment, this lower door is removed.

According to the above, the invention provides three main improvements:
- Additional space for passenger and cargo cabins through the optimization of the space required for the trimmable horizontal tail plane actuator.
- Easier and faster access for trimmable horizontal tail plane actuator maintenance tasks.
- Removal of maintenance platforms located between the actuator and the maintenance door, reducing aircraft weight and reducing manufacturing and maintenance costs.

In addition, the trimmable horizontal tail plane actuator system will be redundant and safer due to the fact that there are two actuator units instead of one. Furthermore, each actuator unit may comprise a clutch to be disengaged in case of failure.

BRIEF DESCRIPTION OF THE DRAWINGS

To complete the description and to provide for a better understanding of the invention, a set of drawings is provided. The drawings form an integral part of the description and illustrate preferred embodiments of the invention. The drawings comprise the following figures.

DETAILED DESCRIPTION OF THE PREFERRED EMBODIMENTS

Figure 1:
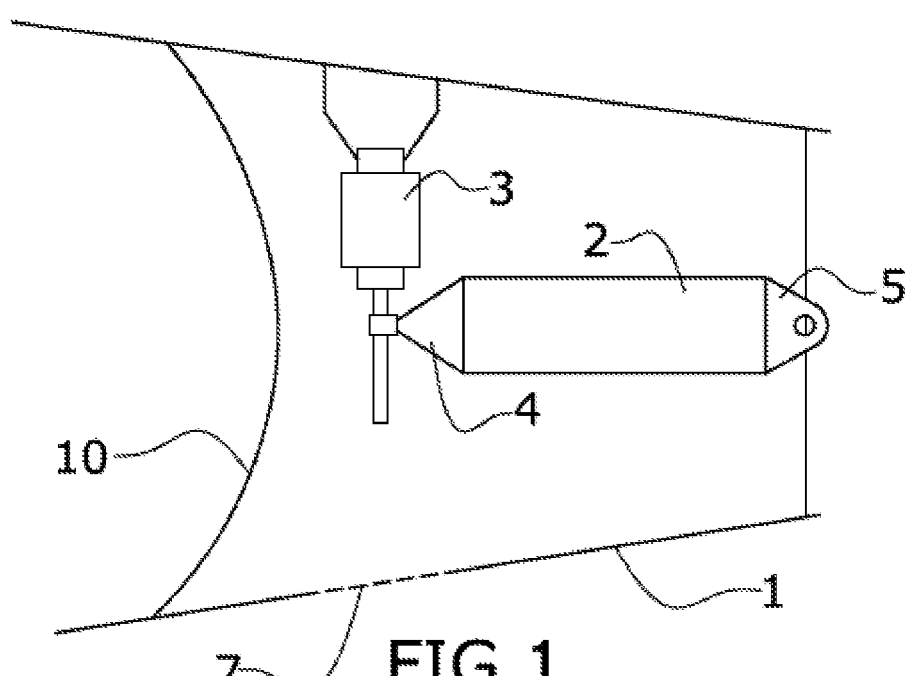
FIG. 1 shows a schematic lateral view of an aircraft empennage known in the state of the art.
Figure 2:
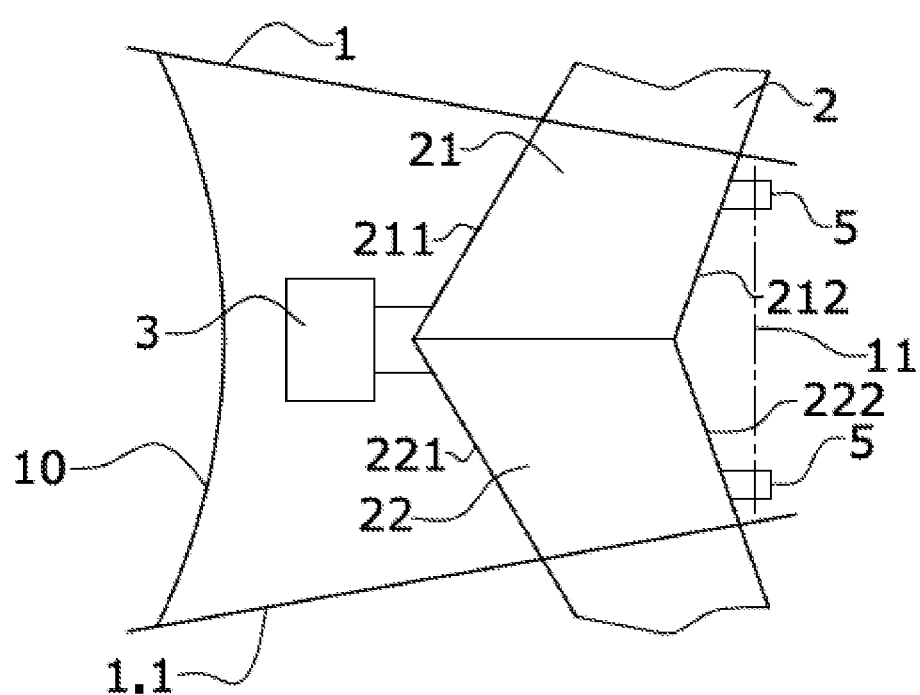
FIG. 2 shows a schematic plan view of the aircraft empennage of FIG. 1 known in the state of the art.
Figure 3:
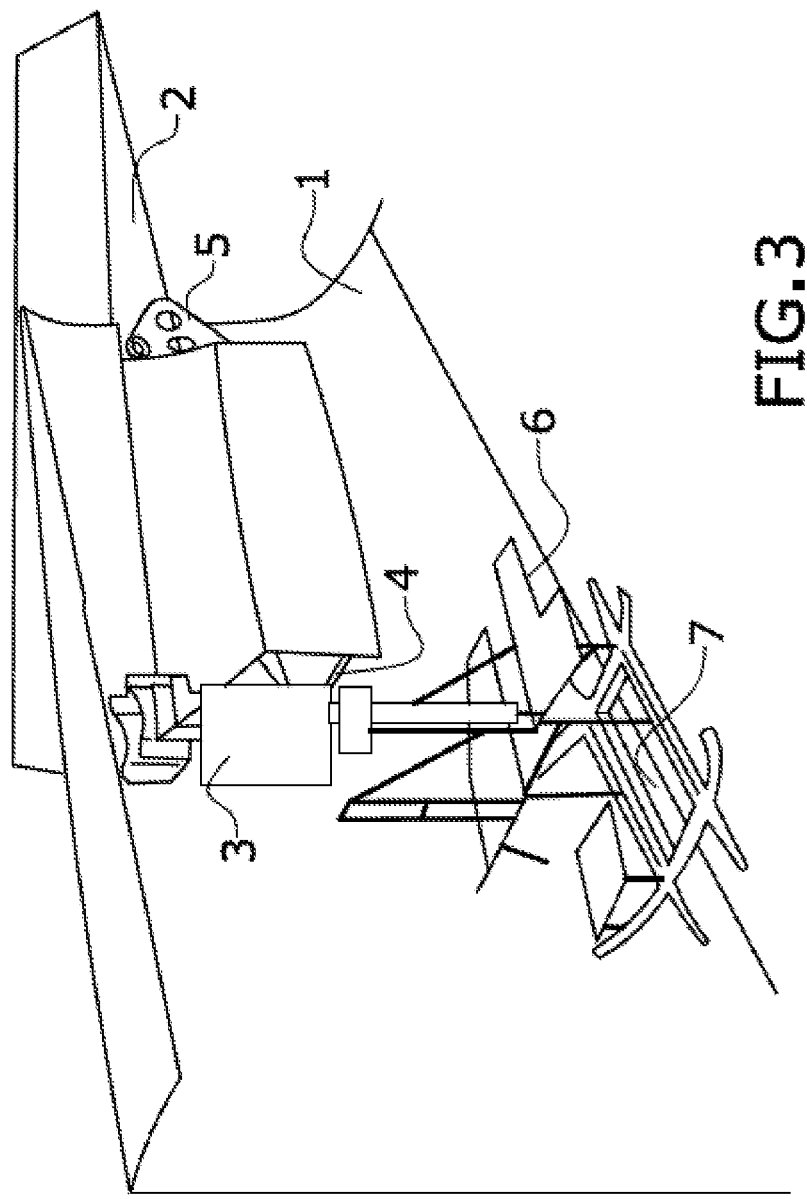
FIG. 3 shows a perspective lateral view of the aircraft empennage of FIG. 1 known in the state of the art.

FIGS. 1 to 3 disclose an empennage known in the state of the art. The known empennage comprises:

A rear fuselage section (1) comprising a skin (1.1) and a frame. It may comprise other internal reinforcing members.

A trimmable horizontal tail plane (2) comprising two lateral torsion boxes (21, 22). Each lateral torsion box (21, 22) comprises a front spar (211, 221) and a rear spar (212, 222).

A front fitting (4) and a rear fitting (5) connected to the trimmable horizontal tail plane (2) and to the fuselage section (1). The front fitting (4) is located in the center of symmetry of the empennage.

An actuator (3) joined to the front fitting (4) for the rotation of the trimmable horizontal tail plane (2) around a hinge axis (11). The actuator (3) is also joined to a fitting attached to the fuselage section (1).

FIG. 3 shows the maintenance platforms (6) located between the actuator (3) and the maintenance door (7) which is located in the lower area of the fuselage section (1).

Figure 4:
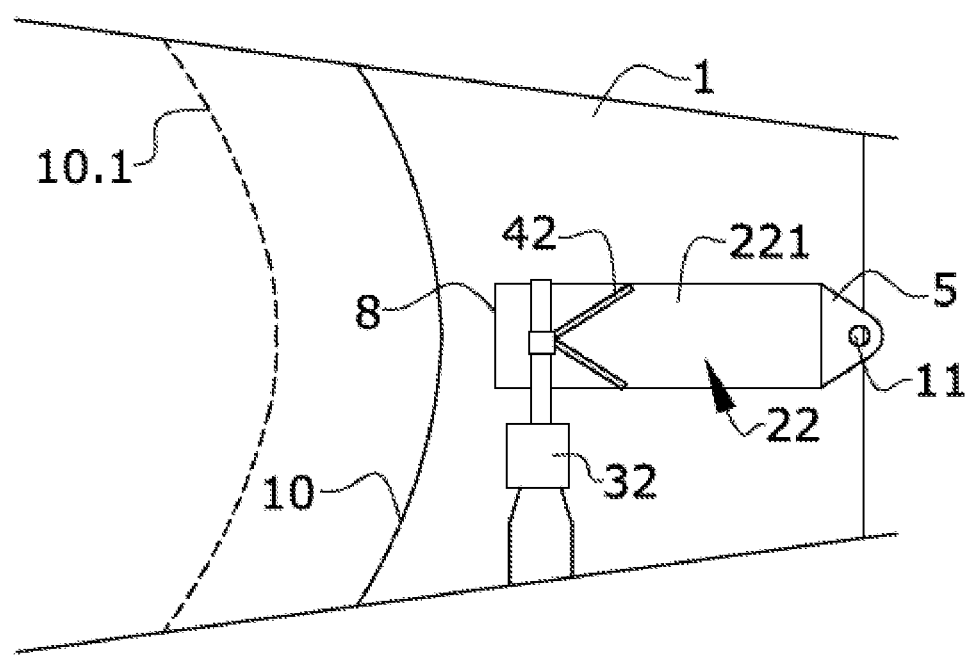
FIG. 4 shows a schematic lateral view of an embodiment of an aircraft empennage according to the invention.
Figure 5:
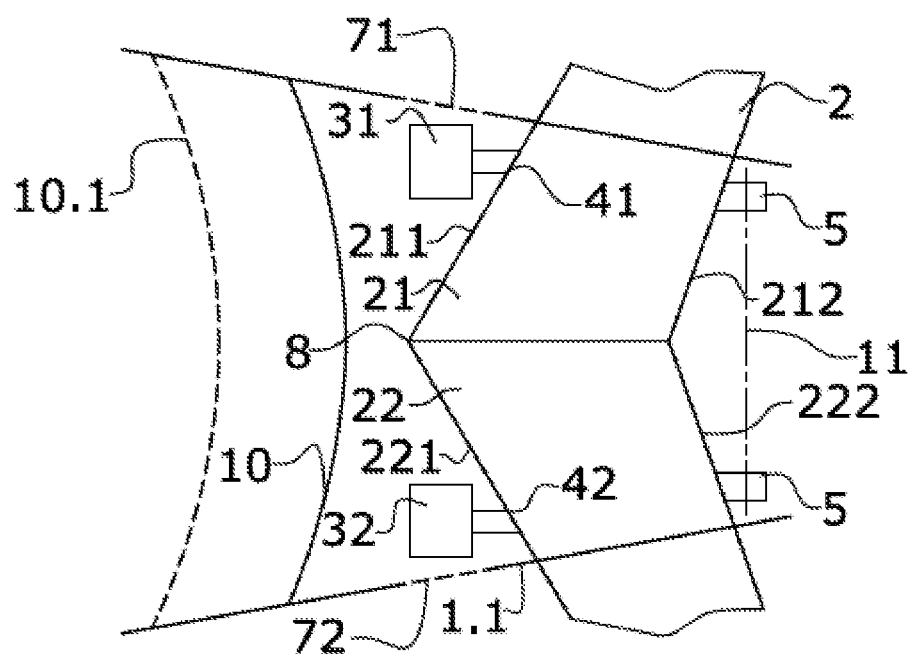
FIG. 5 shows a schematic plan view of the embodiment of FIG. 4.
Figure 6:
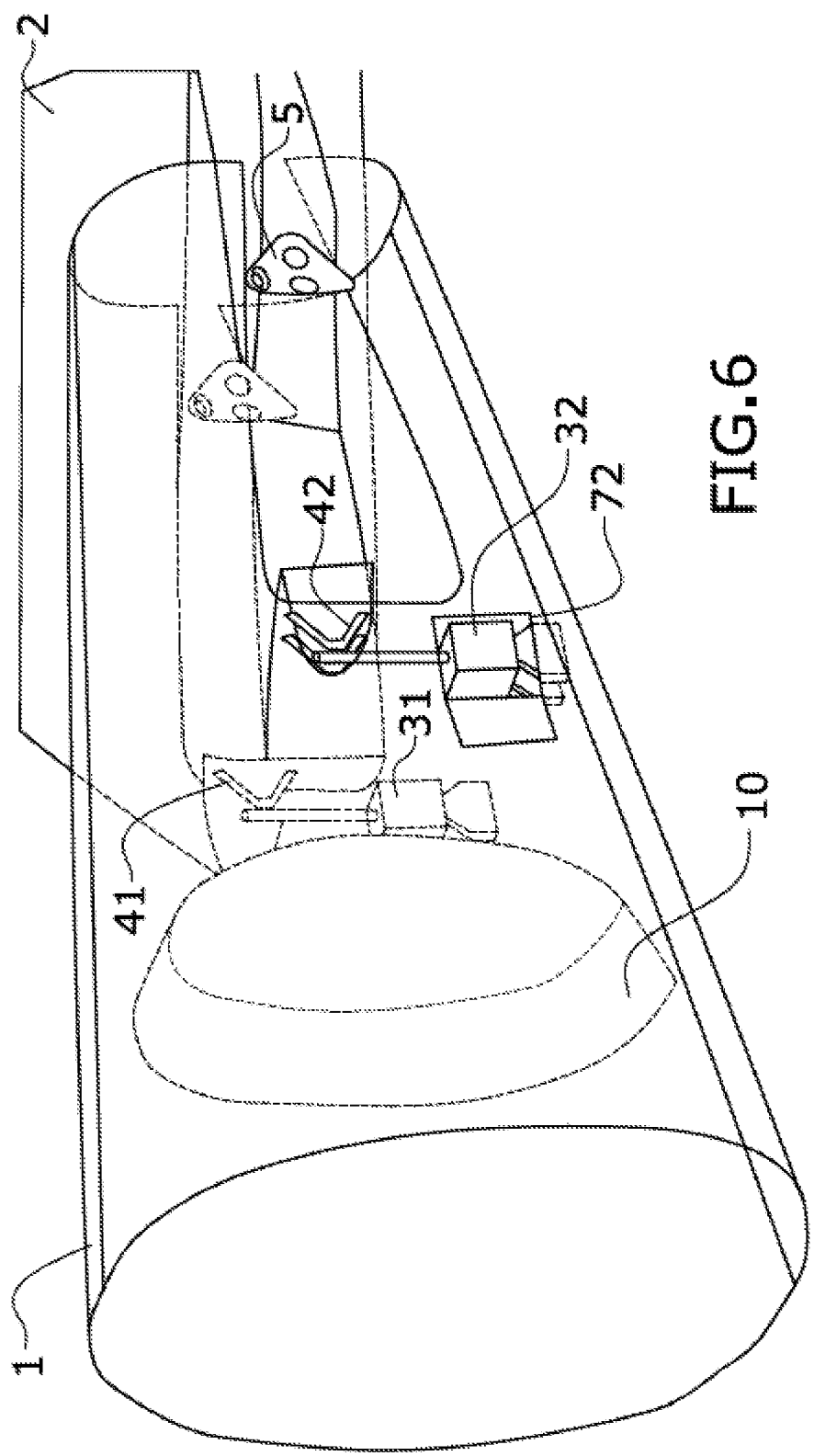
FIG. 6 shows a perspective lateral view of an embodiment of an aircraft empennage.

FIGS. 4 and 5 disclose an embodiment in which the actuator (3) comprises a first and a second actuator units (31, 32), and the front fitting (4) comprises a first and a second front fitting units (41, 42). Each front fitting unit (41, 42) is joined to the front spar (211, 221) of a lateral box (21, 22).

FIGS. 4 and 5 also disclose:
- the rear fuselage section (1),
- the trimmable horizontal tail plane (2) comprising the first and the second lateral torsion box (21, 22), the first and the second lateral torsion box (21, 22) comprising the front spar (211, 221) and the rear spar (212, 222),
- the rear fitting (5) connected to the trimmable horizontal tail plane (2), and
- the hinge axis (11).

As can be seen in the figures, the horizontal tail plane (2) comprises a swept backward angle that allows the placement of the actuator units (31, 32) in a more backward position with respect to the position of the actuator (3) in the state of the art.

In the shown embodiments, the first and the second actuator units (31, 32) are located rearward of the most forward point (8) of the trimmable horizontal tail plane (2) on a longitudinal axis of the rear fuselage section (1). The first and the second actuator units (31, 32) are located respectively between the first and the second front spar (211, 221) of a lateral box (21, 22) and the skin (1.1) of the rear fuselage section (1).

In this embodiment, the position of the Rear Pressure Bulkhead (10) is limited by the most forward point (8) of the trimmable horizontal tail plane (2) and not by the location of the actuator units (31, 32) as it is in the state of the art. The most forward point (8) of the trimmable horizontal tail plane (2) corresponds to the forward point of a junction between the starboard lateral box (21) and the port lateral box (22).

FIGS. 4 and 5 also show in dotted lines the position (10.1) of the Rear Pressure Bulkhead in a configuration of the prior art.

The skin (1.1) of the fuselage section (1) comprises two access doors (71, 72), a first and a second access door (71, 72), located on opposite lateral sides of the rear fuselage section (1).

The central area of the lateral sides of the rear fuselage section (1) is flatter than, for instance, the lower area, therefore this location simplifies the shape and arrangement of the access door.

The first and second access doors (71, 72) are sized to allow for maintenance and also sized for removing or introducing spare parts in the rear fuselage section (1), so as to facilitate assembly and maintenance of the aircraft.

More specifically, the first and the second actuator units (31, 32) are located adjacent to the skin (1.1) of the rear fuselage section (1) so that maintenance and replacement tasks can be performed from outside of the aircraft through the access doors (71, 72).

Figure 7:
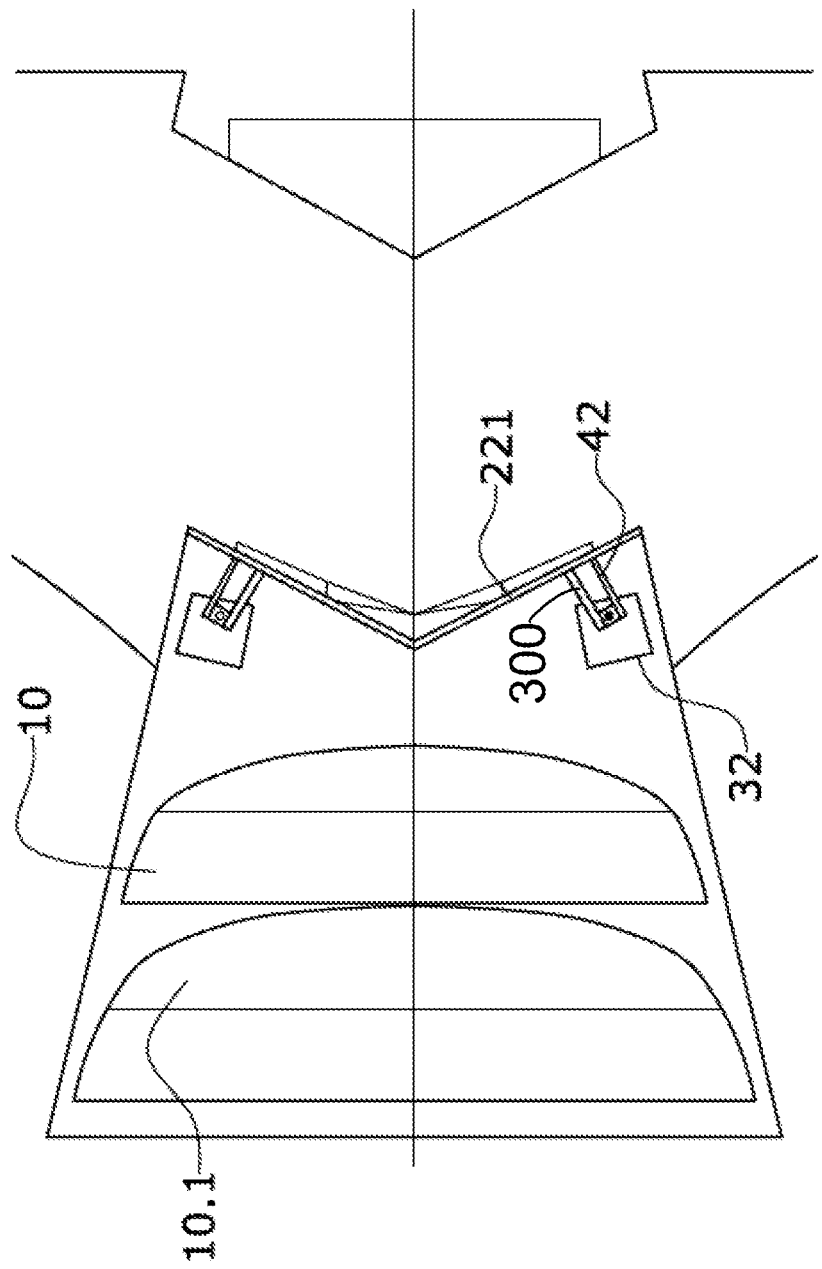
FIG. 7 a schematic plan view of an embodiment of an aircraft empennage.

In the embodiment shown in FIG. 7, the first and the second front fitting units (41, 42) comprises an elongated support bar (300). The support bars (300) are attached by one end to the front spar (221, 211) and at the other end to the actuator units (31, 32). The support bars (300) are located in a plane perpendicular to the front spar (221, 211) such that they point towards the lateral sides of the rear fuselage section (1). With an adapted length of the support bars (300), the actuator units (31, 32) may be placed as close as possible to the skin (1.1) so as to simplify maintenance and manufacturing.

Preferably, the two actuator units (31, 32) are located in the same longitudinal section of the fuselage section (1) on an axis parallel to the pitch axis ("Y") of the aircraft.

In the shown embodiments, each actuator unit (31, 32) is located under or above each of the front fittings (41, 42) with respect to a Z-axis of the aircraft empennage, the Z-axis being parallel to a yaw axis of the aircraft. Therefore, the actuator units (31, 32) perform a linear movement to act on the horizontal tail plane.

The two actuator units (31, 32) are joined to the lower part or to the upper part of an internal reinforcing member, for instance a frame, so that the actuator unit (31, 32) is located above or below the HTP with respect to the Z-axis of the aircraft empennage. This frees the lateral sides of the empennage section (1) from attachments and allows access to the actuator units (31, 32) from the lateral sides of the empennage. Location in the lower area provides a good access for maintenance.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An aircraft empennage, comprising:
a rear fuselage section comprising a skin and a frame,
a trimmable horizontal tail plane comprising a first and a second lateral torsion box, the first and the second lateral torsion box comprising a front spar and a rear spar,
a front fitting and a rear fitting connected to the trimmable horizontal tail plane and to the fuselage section,
an actuator configured to act on the front fitting for a rotation of the trimmable horizontal tail plane around a hinge axis passing through the rear fitting and orthogonal to a vertical longitudinal plane of symmetry of the fuselage section,
wherein the front fitting comprises a first and a second front fitting units, the first front fitting unit being joined to the front spar of the first lateral torsion box and the second front fitting unit being joined to the front spar of the second lateral torsion box, and
wherein the actuator comprises a first and a second actuator units, the first actuator unit being configured to act on the first front fitting unit and the second actuator unit being configured to act on the second front fitting unit,
wherein the first and the second actuator units are located in front of the front spar and rearward of a most forward point of the trimmable horizontal tail plane on a longitudinal axis of the rear fuselage section,
wherein the first front fitting unit and the second front fitting unit each comprise an elongated support bar located in a plane perpendicular to the front spar, the elongated support bars pointing towards lateral sides of the rear fuselage section.

2. The aircraft empennage, according to claim 1, wherein the horizontal tail plane comprises a swept backward angle.

3. The aircraft empennage, according to claim 1, wherein the fuselage section comprises a first access door to the first front fitting unit and a second access door to the second front fitting unit, said access doors being located on opposite lateral sides of the rear fuselage section.

4. The aircraft empennage, according to claim 1, wherein the first and the second actuator units are located adjacent to the skin of the rear fuselage section.

5. The aircraft empennage, according to claim 1, wherein the first and the second actuator units are located in the same longitudinal section of the fuselage section on an axis parallel to a pitch axis of the fuselage section.

6. The aircraft empennage, according to claim 1, wherein each of the first and the second actuator units is located under or above each of the front fitting units with respect to a Z-axis of the aircraft empennage.

7. The aircraft empennage, according to claim 1, wherein the first and the second actuator units are joined to a lower part or to an upper part of a frame.

* * * * *